Nov. 22, 1966     H. KESTEL     3,286,790
LUBRICATING MEANS FOR A SYSTEM FOR A MANUALLY GUIDED
MOTOR DRIVEN WORKING DEVICE
Filed July 6, 1964     2 Sheets-Sheet 1
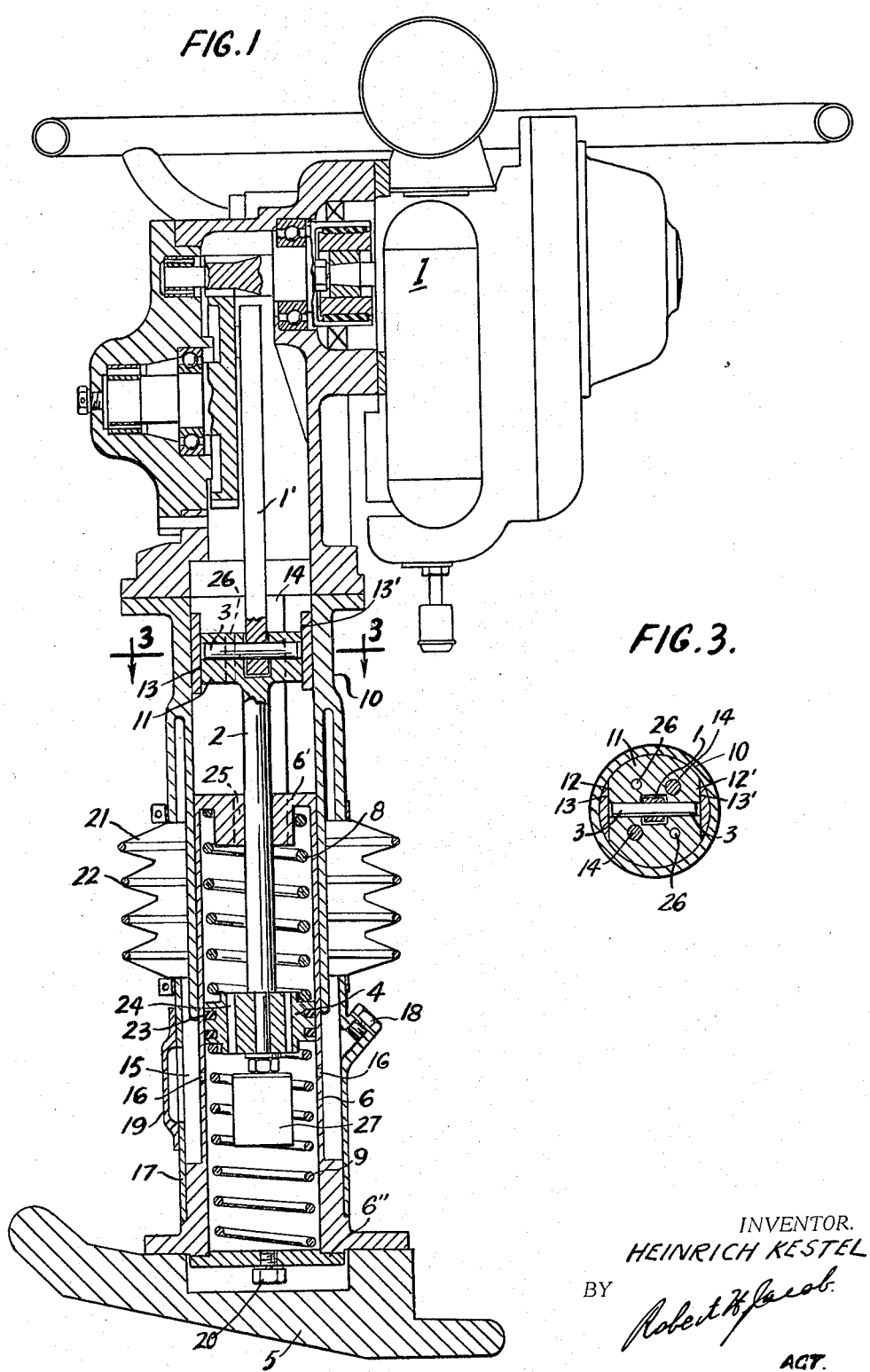
INVENTOR.
HEINRICH KESTEL
BY
AGT.

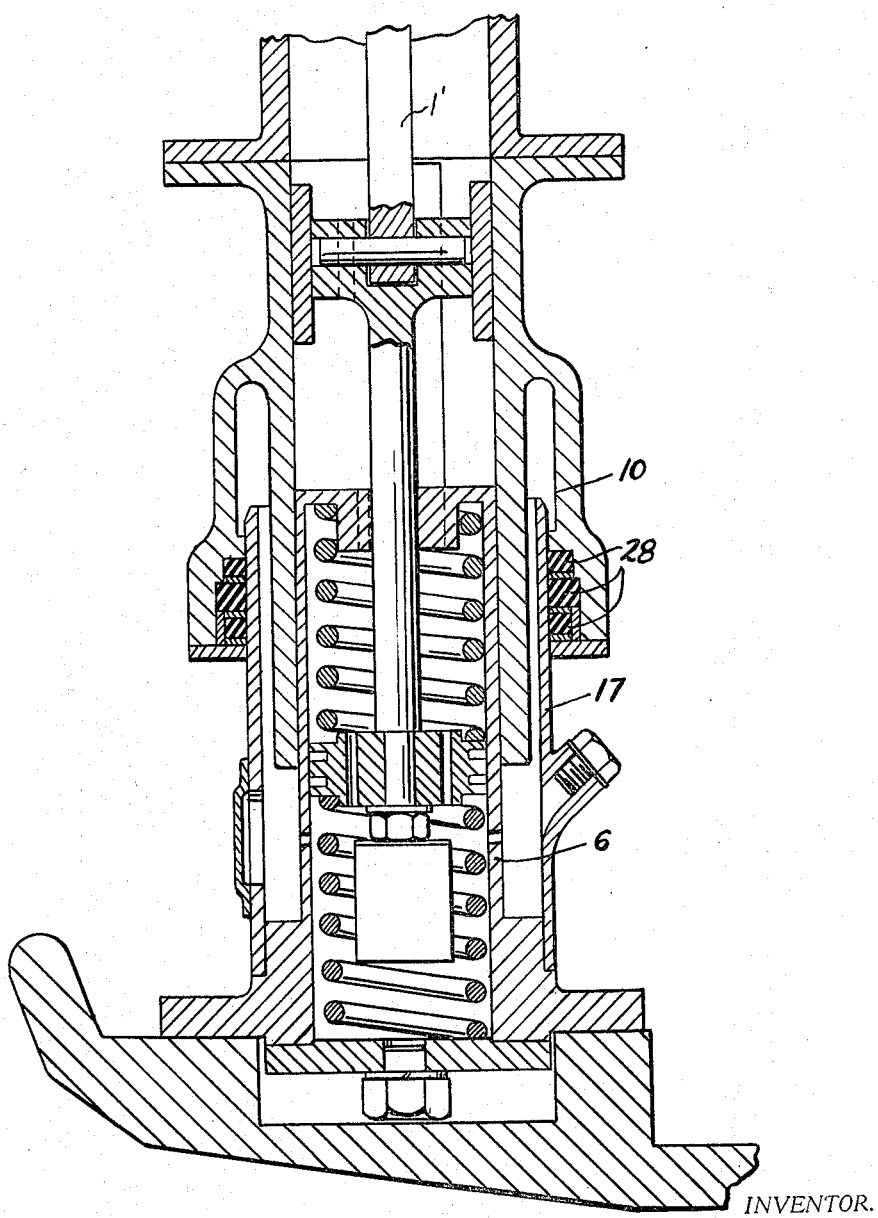

United States Patent Office 3,286,790
Patented Nov. 22, 1966

3,286,790
LUBRICATING MEANS FOR A SYSTEM FOR A MANUALLY GUIDED MOTOR DRIVEN WORKING DEVICE
Heinrich Kestel, Munich, Germany, assignor to Hermann Wacker and Peter Wacker, Munich, Germany
Filed July 6, 1964, Ser. No. 380,329
Claims priority, application Germany, July 19, 1963, W 34,922
8 Claims. (Cl. 184—6)

The invention relates to an oil lubricating arrangement for a reciprocating system of a manually guided, motor driven working apparatus or tool.

Many forms of vibrating or reciprocating systems, also referred to as swinging systems, of this type are known. All of these reciprocating systems, however, present a considerable lubricating problem. The movable parts of these apparatuses normally comprise, besides the motor and various bearings, a crank transmission, a crank pin to which a piston rod is connected, which in turn is rotatably secured by means of a bolt to a piston. The piston reciprocates in the housing of the working apparatus or tool and supports a percussion piston with one or several springs interposed and to which the tool is secured by way of a piston rod.

In a second embodiment of this type of apparatus a connecting rod engages a cylinder which is axially movable in the housing of the working apparatus or tool. In the interior of this displaceable cylinder a piston is slidably mounted which is supported against both inner end surfaces of the cylinder by means of springs. The connection between the piston and the tool connected to the other end of the device is in the form of a piston rod.

A third embodiment of such an apparatus corresponds to the second embodiment mentioned above with the difference that the connecting rod is linked to a piston rod, and the piston slides in a cylinder. This cylinder in turn is axially slidable in the housing of the apparatus and moved by the piston while the piston is biased or supported against the ends of the cylinder by means of springs.

All of these movable parts were lubricated heretofore by means of lubricating grease, which involves particular difficulties. Especially the reciprocating pistons and cylinders of the vibrating or reciprocating system were endangered. It was necessary in order to keep them in operating condition to grease them daily, which frequently was not carried out, especially at rugged construction sites. As a consequence heavy wear and grinding of the movable part occurred and as a result rapid deterioration of the equipment.

The invention provides the advantage that the equipment or tool which has a rammer or tamping foot connected to a cylinder which is filled with oil to a level predetermined by axial bores in the housing or casing of the cylinder oil is pumped upwardly by the reciprocating movement of the piston through axial bores in the piston, through further axial bores in the cylinder and in the joint member for the joint or wrist pin into the upper transmission space. Owing to the high number of reciprocations of the piston and due to the different oil passages or apertures in the piston, the cylinder, and the joint member, the oil is atomized and reaches the parts to be lubricated in the form of a vapor.

As compared to known lubricating systems, the invention provides the advantage that even, satisfactory lubrication is constantly obtained and that in lieu of daily greasing only a changing of the oil at greater time intervals is required. Furthermore, the oil lubrication permits protecting parts that slide upon one another against friction in that the oil which returns carries along friction particles, which essentially decreases the wear. In addition, the provision of an oil discharge screw in the form of a magnetic screw eliminates friction particles from the oil.

A further essential advantage of this lubricating system resides in reducing blows and shocks. If the rammer or tamping foot of the reciprocating system suddenly effects opposite movements, these are softened by a change in the effective lubricant cross-section so that the turns of the springs can no longer beat against each other. This helps to avoid deforming and breaking of the springs.

Furthermore, the lubricating system in accordance with the invention provides the advantage of effective cooling of the apparatus by the atomized oil which is in the form of a vapor.

Further advantages and objects of the invention will become apparent from the following specification with reference to the drawings, which illustrate embodiments of the invention and in which:

FIG. 1 is a cross-section of an apparatus provided with the lubricating system and bellows sealing means in accordance with the invention;

FIG. 2 is a cross-section of an apparatus provided with the lubricating system and gasket sealing rings;

FIG. 3 is a section taken along line 3—3 in FIG. 1 through the joint member of the apparatus.

The apparatus in accordance with the invention is provided with motor drive means including crank transmission means generally identified in the drawings at 1, which is provided with a connecting rod 1'. The connecting rod 1' is linked by means of a wrist pin 3 to the piston rod 2 of a guiding piston 4. The guiding piston 4 slides in the guiding cylinder 6 to which is connected a rammer or tamping foot 5. This connection may be rigid or releasable so that the rammer may be exchanged. Between the two piston surfaces of the piston 4 and the cylinder end portions 6' and 6'' of the guiding cylinder 6, springs 8 and 9 are interposed. The guiding cylinder 6 which carries the rammer or tamping foot 5 slides in the outer cylinder 10 which constitutes the housing of the apparatus. The wrist pin 3 is provided with a joint member 11 in order to protect the tamping foot against rotation, and the joint member 11 slides in the housing 10 and its outer cylindrical configuration is provided with two oppositely disposed flat surfaces 12 and 12'. These side surfaces correspond to the side surfaces 13 and 13' of the housing 10. For the purpose of preventing also cylinder 6 from rotating two rods 14 that are displaceable in the joint member 11 are provided at its upper end surface 6'.

For lubricating purposes the lower cylinder space is filled with oil up to the line 15. The oil space in the cylinder is connected by way of bores 16 with the oil space formed by cylinder 6 and the outer cylinder casing 17. The oil is filled in through an oil inlet opening 18. The oil sight window 19 serves for observing the level of the oil. The oil is discharged through a magnetic bolt 20. The sealing of the apparatus towards the outside and the connection of the filling stub 17, which is preferably made of a plastic material, with the housing 10 is effected by the bellows 21. For stiffening the bellows wire rings 22 are embedded in the grooves. Sealing rings 23 or the like are provided for sealing the piston 4.

The crank of the motor causes the piston 4 to move by way of the connecting rod 1' and piston rod 2. Due to the high number of reciprocations the oil is pumped out of the lower cylinder space by way of the bore 24 into the upper cylinder space and thence by way of bore 25 of the upper cylinder end surface 6' and bores 26 of the joint member 3 into the space of the transmission. During the pumping operation and while passing through the bores the oil is atomized so that only an effective saturated oil atmosphere passes through to the parts to be lubricated.

Shocks or rebounding can be reduced or prevented in that as soon as piston 4 closes the aperture 16 the effective cross-sectional area for the oil is decreased and the oil can only escape through suitably formed bores 24. Thus the oil meets the piston 4 with increased resistance during the upward movement or the cylinder 6 during its downward movement. An additional safeguard is constituted by the rubber piston 27 which prevents a too close approach of the bottom 6' of the cylinder and the lower end of the piston.

In FIG. 2 the same lubricating system is illustrated. In this embodiment of the invention the sealing toward the outside is not obtained by means of a bellows 21 but by means of sealing gaskets 28 which are effective between the housing 10 and the downwardly extended protective casing 17.

Having now described my invention with reference to the embodiments illustrated in the drawings, I do not wish to be limited thereto, but what I desire to protect by Letters Patent is set forth in the appended claims.

I claim:

1. Lubricating means for a reciprocating system of a motor driven, manually guided working apparatus which effects reciprocating working movements, said apparatus being adapted for operation by a motor and including a housing for the transmission of forces, a joint member movable in said housing and having a wrist pin connected to the motor by means of a connecting rod, an element including a guiding cylinder movable in said housing and a rammer or tamping foot carried by said element, a guiding piston having a piston rod connected to said joint member reciprocally movable in said cylinder and spring means interposed between said guiding piston and said guiding cylinder, said joint member having a passage for oil extending therethrough, said guiding cylinder having a plurality of radial apertures and a lower portion for holding a lubricant such as oil and having an upper portion having an oil passage extending therethrough, and said guiding piston having at least one oil passage, said passages in said guiding piston, said upper cylinder portion and in said joint member being adapted to pass oil in atomized condition upwardly to components to be lubricated.

2. Lubricating means in accordance with claim 1 including a rubber piston mounted at the end of said sliding piston.

3. Lubricating means in accordance with claim 1 including gaskets mounted on said sliding piston.

4. Lubricating means in accordance with claim 1 including a bellows for sealing said housing and disposed intermediate said housing and said guiding cylinder element, said bellows having a plurality of grooves and a wire ring being disposed in each groove.

5. Lubricating means in accordance with claim 1 including sealing gasket means interposed between said housing and said cylinder element.

6. Lubricating means for a reciprocating system of a motor driven, manually guided working apparatus which effects reciprocating working movements, said apparatus being adapted for operation by a motor and including a housing for the transmission of forces, a joint member movable in said housing and having a wrist pin connected to the motor by means of a connecting rod, an element including a guiding cylinder movable in said housing and a rammer or tamping foot carried by said element, a guiding piston having a piston rod connected to said joint member reciprocally movable in said cylinder and spring means interposed between said guiding piston and said guiding cylinder, said joint member having a passage for oil extending therethrough, said guiding cylinder having a plurality of radial apertures and a lower portion for holding a lubricant such as oil and having an upper portion having an oil passage extending therethrough, and said guiding piston having at least one oil passage, said passages in said guiding piston, said upper cylinder portion and in said joint member being adapted to pass oil in atomized condition upwardly to components to be lubricated, said cylinder having an outer casing provided with a tubular inlet opening and having an oil sight window of plastic or the like.

7. Lubricating means for a reciprocating system of a motor driven, manually guided working apparatus which effects reciprocating working movements, said apparatus being adapted for operation by a motor and including a housing for the transmission of forces, a joint member movable in said housing and having a wrist pin connected to the motor by means of a connecting rod, an element including a guiding cylinder movable in said housing and a rammer or tamping foot carried by said element, a guiding piston having a piston rod connected to said joint member reciprocally movable in said cylinder and spring means interposed between said guiding piston and said guiding cylinder, said joint member having a passage for oil extending therethrough, said guiding cylinder having a plurality of radial apertures and a lower portion for holding a lubricant such as oil and having an upper portion having an oil passage extending therethrough, and said guiding piston having at least one oil passage, said passages in said guiding piston, said upper cylinder portion and in said joint member being adapted to pass oil in atomized condition upwardly to components to be lubricated, said cylinder having an outer casing provided with a tubular inlet opening and having an oil sight window of plastic or the like, and an oil discharge bolt of magnetic material being secured in the bottom end of said guiding cylinder.

8. Lubricating means for a reciprocating system of a motor driven, manually guided working apparatus which effects reciprocating working movements, said apparatus being adapted for operation by a motor and including a housing for the transmission of forces, a joint member movable in said housing and having a wrist pin connected to the motor by means of a connecting rod, an element including a guiding cylinder movable in said housing and a rammer or tamping foot carried by said element, a guiding piston having a piston rod connected to said joint member reciprocally movable in said cylinder and spring means interposed between said guiding piston and said guiding cylinder, said joint member having a passage for oil extending therethrough, said guiding cylinder having a plurality of radial apertures and a lower portion for holding a lubricant such as oil and having an upper portion having an oil passage extending therethrough, and said guiding piston having at least one oil passage, said passages in said guiding piston, said upper cylinder portion and in said joint member being adapted to pass oil in atomized condition upwardly to components to be lubricated, and means being provided for securing said guiding piston and cylinder against turning, said means comprising a pair of rods connected to the upper end of said guiding cylinder and slidably received in said joint member, and oppositely disposed flat surface portions on said joint member and in said housing.

References Cited by the Examiner

UNITED STATES PATENTS

| | | | |
|---|---|---|---|
| 2,454,620 | 11/1948 | Wilde | 184—6 X |
| 2,845,050 | 7/1958 | Wacker et al. | 94—49 X |

LAVERNE D. GEIGER, *Primary Examiner.*

H. BELL, *Assistant Examiner.*